May 15, 1934. F. W. COOPER Re. 19,163

RAIL ANCHOR

Original Filed Feb. 1, 1926

Inventor
Francis W. Cooper
By
Attorney

Reissued May 15, 1934

Re. 19,163

UNITED STATES PATENT OFFICE 19,163

RAIL ANCHOR

Francis W. Cooper, Montreal, Quebec, Canada, assignor, by mesne assignments, to The Stead Rail Anchor Company, Limited, Montreal, Quebec, Canada, a corporation of Canada Original No. 1,682,370, dated August 28, 1928, Serial No. 85,356, February 1, 1926. Application for reissue June 10, 1930, Serial No. 460,775

40 Claims. (Cl. 238—324)

This invention relates broadly to improvements in rail anchors and more particularly to improvements in rail anchors of the type shown in United States Patent No. 1,366,558, issued the 25th January 1921, to Cooper and Steadworthy, and in my Patent 1,618,576, granted February 22, 1927, in both of which a rail is gripped at the edges of its base flanges between a U-shaped clamp, or rail gripping member, and a hooked spring clip, or retaining member.

The object of the present invention is to provide an improved form of spring clip which will have efficiency at least equal to the clips formerly disclosed but capable of application to and removal from a rail with greater ease and with less danger of strain in application.

A further object is to provide a form of clip which may be manufactured with ease and accuracy and to provide a method of manufacturing the same which will overcome difficulties now experienced.

Various other objects and the advantages of the invention may be ascertained from the following description and the drawing relating thereto.

In the patents already referred to, the clamp is formed of flat bar metal, bent to a flat-bottomed U-shape and notched in the edges of its arms for reception of the base flange of a rail, the notches being so located that when the clamp is applied to a rail the flat central portion is disposed almost entirely beneath the flange from which it depends and in a plane inclined thereto and converging toward the opposite base flange. In the present invention the clamp, or rail gripping member, is of substantially the same form as disclosed in the first mentioned patent, while the spring clip, or retaining member, follows more the form shown in Figure 4 of my patent already identified. In that form the clip is a spring member adapted to underlie the rail base transversely thereof, hooked at one end to engage one flange of the base and looped at the other end to be engaged in compression between the underside of the rail base and the inclined central portion or seat of the clamp, the intermediate portion of the clip being spaced from the rail and being engaged from beneath when in operation by the upturned or hooked extremity of the bar from which the member is formed.

It has been found in the course of manufacture of clips as just described that some variation occurs in the length of strips or blanks cut from stock for formation of the clips, the variation usually taking the form of excessive length. The extra length might perhaps be absorbed in the loop of the clip but, with the methods of manufacture presently followed, the surplus length appears at one end of the other and causes the hook at such end to be excessively long with the result that the clip is difficult to apply and is subjected to unnecessary stresses, which frequently develop strains operating to lower the efficiency of the anchor. On the other hand, if the blank is of insufficient length, the deficiency is concentrated in one of the end hooks and the clip is defective in rail gripping power or may be useless. According to this invention, such inaccuracy in the length of the blank is automatically compensated for in a manner to enable the clip to be made with exactitude, and at the same time, a series of advantages are realized both in the clip itself and in the production thereof, as will be hereinafter fully explained.

In the drawing which illustrates the invention;—

Figure 1:
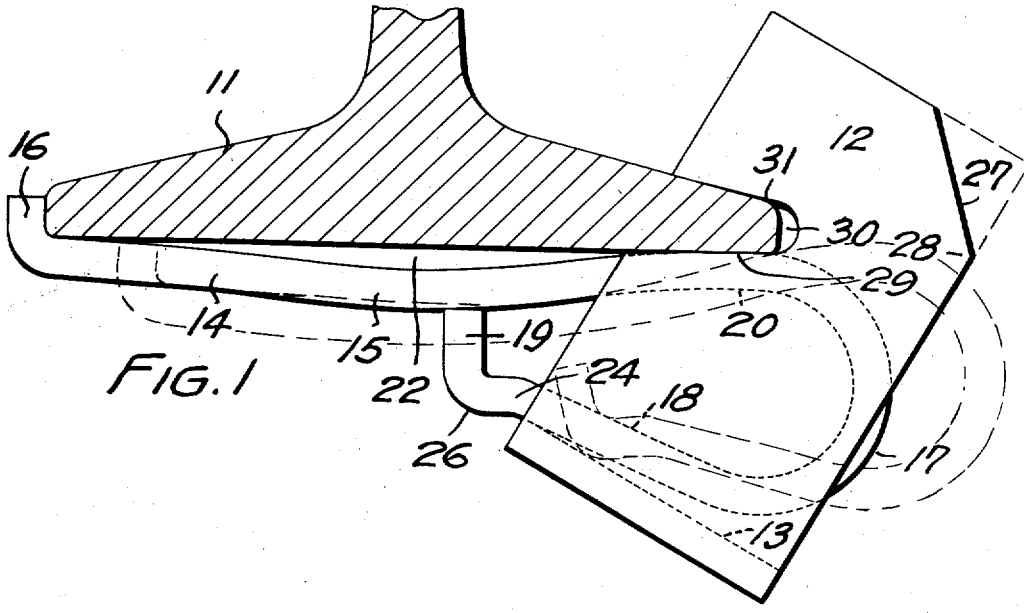
Fig. 1 is a side elevation of an anchor in operative position on a rail and exhibiting at the loop end the structural peculiarities embodying the present invention.

Referring more particularly to the drawing, 11 designates the flanges of a rail base to one of which a clamp 12, of substantially the form disclosed in the patents aforesaid, is designed for attachment as shown, so as to locate its central or seat portion 13 beneath that flange of the rail base to which the clamp attaches and in a plane inclining toward the opposite base flange.

The clip, designated as a whole by the numeral 14, is of the general looped form already disclosed, particularly in my patent aforesaid, and includes a shank or long arm 15 terminating at one end in an upwardly or outwardly turned hook 16 and at the other end in a loop 17, the tail portion 18 of which (on occasion referred to as the short arm) inclines toward the central part of the shank and terminates in an upwardly or inwardly turned hook 19 adapted to have substantially end abutting relation with the shank at approximately the medial point thereof. The shank or long arm is bent or curved downwardly or inwardly between its ends, so as to be spaced, in its central portion, below a rail base when applied thereto. This central portion of the shank merges into the loop 17 through a substantially flat or slightly reversely curved portion 20. A gradual reverse curvature between the hook 16 and loop 17, somewhat as shown in Figure 1 of my patent, is now preferred, for reasons of stress distribution, to the definitely flat portion adjacent the loop and comparatively sharp bend into the downwardly curved portion as shown in Figure 4 of the said patent.

Familiarity with the action of the spring clip in application to and removal from a rail and also in service is essential to thorough comprehension of the improvements herein dealt with and of the importance thereof.

The clamp is first driven firmly on one base flange of a rail and the clip then passed hook end first through the tapering opening between the clamp seat and rail. When the hook 16 has advanced an appreciable part of the distance across the base, both it and the shank adjacent the loop are pressed up against the rail base by engagement of the loop tail with the upper end of the clamp seat as shown in broken lines, Figure 1. Further advance of the clip can be attained only by application of force, usually by striking with a hammer on the loop. As this forcible advance continues, the short arm or loop tail 18 travels up the inclined clamp seat and the space 21 which exists between the end of the hook 19 and the arm 15 when the clip is relaxed (see Figure 2) is first closed up by flexion of the loop and arms. Upon further advance of the clip, the upward movement of the hook 19, due to the inclination of the clamp seat, causes the same to thrust upwardly against the shank with straightening tendency and usually with resulting flexion sufficient to substantially straighten the shank. On completion of the driving, the hook 16 passes the edge of the rail base and is forced up to the position shown in Figure 1 by the tensioned shank, thus partially relieving the tension of the shank which tends to resume its original curvature and provide the clearance 22 between itself and the rail base, but without re-establishing the clearance at 21. It will be noted that the curvature of the shank is less when on the rail than when off the rail and relaxed, thus indicating considerable tension of the shank with, however, a large remaining resilient capacity to absorb vibration and maintain the grip of the anchor on the rail in the manner fully explained in the Cooper and Steadworthy patent.

The amount of flexion of the shank during application depends upon the lengths of the hooks 16 and 19 and in service the amount of flexion depends upon the length of the hook 19. If either hook is improperly long, the shank is subjected to excess flexion in application, which excess may be sufficient to completely straighten the shank or even bend it in the opposite direction. Such excess curvature unnecessarily stresses the shank and, if the temper of the steel is low, will cause a strain producing a weak sluggish clip with poor gripping power or very little reserve resiliency. If the temper is too high breakage will probably result. In either case, the clip will be unnecessarily hard to drive and will exhibit a very marked tendency to recoil if not fully driven in one blow. If the hook 19 is too long, there will be in addition to the foregoing an excessive flattening of the shank in service, which reduces the flexibility of the clip and causes premature fatigue of the metal inviting strain or breakage. If the hook 16 is too short or is improperly formed by reason of insufficient metal available for satisfactory bending, the hook is liable to slip under the rail base and release the clip; while if the hook 19 is too short an effective tension is not realized and the anchor has very little holding capability. It will be seen from the foregoing that the length of the hooks is a very important factor in the proper functioning of the clip.

Figure 2:
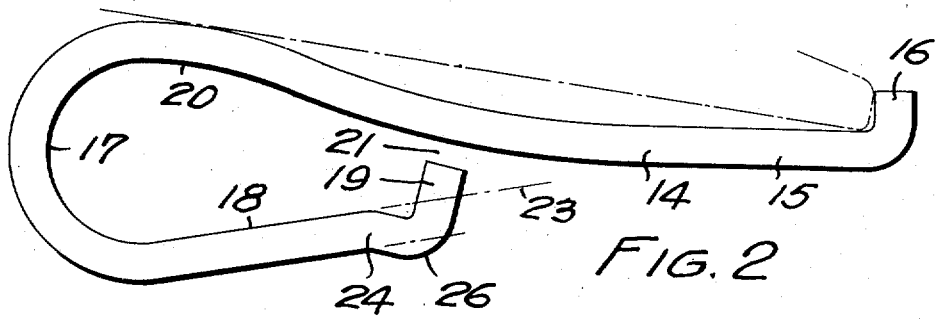
Fig. 2 is a side elevation of the spring of Figure 1, in the relaxed form assumed when detached from a rail.

The term "length" as applied to the hooks is the effective length and may be defined as the projection of a hook beyond the general plane of the arm carrying it; thus the length of the hook 19 in Figures 1 and 2 is the projection inward from the plane of the adjacent surface or face of the loop tail 18, which plane is, for convenience of observation, indicated through the hook by the line 23 and hereafter referred to as the face plane of the tail. The plane of the opposite surface may be termed the back plane. It will be seen by comparison of Figures 2 and 3 that the "length" or effective length of the corresponding hooks is the same, whereas the actual length of the hook 19 in Figure 2 is greater than its effective length and greater than the actual length of the corresponding hook in Figure 3.

In manufacture of the clips, as now practised, the first step after shearing of the blank is the simultaneous formation of the hooks 16 and 19. In this operation one end of the blank is butted against a stop or gauge, with the result that the hook formed at this end will be usually of proper length, whereas the other will have concentrated in it any inaccuracy in the length of the blank. Preferably the hook 19 is formed at the gauge end of the blank, so that any error in length, plus or minus, is found in the hook 16.

Figure 3:
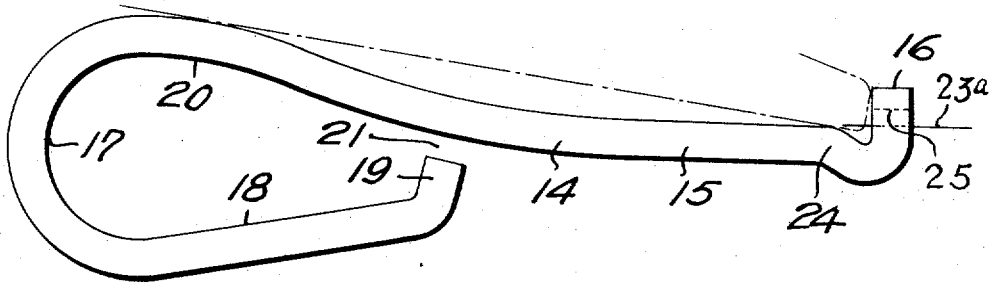
Fig. 3 is a view similar to Figure 2, depicting the embodiment of the invention at the hook end of the clip.

In order to compensate for error in length of the blanks and in the lengths of the hooks, the blanks are cut slightly longer than would be necessary for formation of square hooks, such as 16 in Figure 2 and 19 in Figure 3. The blank is then bent to shape with either or both hooks of actual length intentionally greater than the desired effective length and the excess length disposed of by pressure on the end of the hook in the direction of hook length and toward the arm, which is unsupported in the line of such pressure but is supported at a point close to the hook, so that bending of the arm results at the point 24, the bending being of such extent that the hook is driven bodily toward the arm until the hook end is the proper distance from the plane of the adjacent surface or face of the arm as indicated by the line 23a, Figure 3, and hereinafter referred to as the face plane of the arm. The plane of the opposite surface may be termed the back plane. Thus, the desired effective length is attained. This applies equally to the hook 19 of Figures 1 and 2 and to the hook 16 of Figure 3, or to both hooks if it is desired to form both hooks in this fashion. While the error in blank length is usually an excess of length, it is found desirable to deliberately provide an excess of length in order to cope with blanks which have been cut short, the intentional excess serving to counteract the shortage and yield a blank which will form a clip with little or no bend or bends 24.

In the bending of hooks, such as the hook 16 of Figures 1 and 2 or the hook 19 of Figure 3, it is difficult to establish a proper angular relation between the hook and the arm, because of variations in the resistance of the metal to bending or because of the shortness of the hook. Any such difficulty is overcome when hooks are formed as herein described, so that perfection in this respect, as well as in length, results. Clips which have been manufactured by other processes and which are imperfect by reason of malformed or overlong hooks may be perfected by reforming the hooks thereof to the shape herein disclosed.

A very material advantage which has been found to flow from the novel method of forming and from the form of hooks is the possibility of forming hooks of very short effective length. In commercial manufacture, it is practically impossible to bend a hook the length of which is less than the thickness of the material being bent. Usually, the shortest hook that can be bent is slightly longer than the thickness of the material. By utilizing the method herein described, a hook may be produced much less in effective length than could be otherwise bent. This is of considerable importance in case of the hook 16. It is found that for rail gripping purposes the hook, as shown in Figures 1 and 2, is unnecessarily long, but is the shortest that can be bent from the material. The unnecessary length is objectionable in that it increases the flexion of the shank 15 in driving the clip and renders the driving more difficult. Therefore, a hook initially formed like the hook 16 in Figures 1 or 2, for example, may be reformed to reduce the effective length thereof as indicated by the dotted line 25 in Figure 3, or may be initially formed with the same very short effective length. Such very short hooks 16 are essential in clips designed for narrow rail bases, where the projection of the shank 15 beyond the hook 19 is proportionately much less than shown in the drawing. It will therefore be understood that a clip may be provided with a hook 19 set back to form a recoil stop and may also have the hook 16 similarly formed to absorb excess length of the blank and/or to reduce the effective length thereof for greater ease of driving and for reduction of stress on the shank in such driving. In short, the clip may be made with either hook or both hooks so formed according as circumstances may render it desirable or necessary.

In my patent, already referred to, the long arm hooks of clips are shown in Figures 2, 3 and 4 as of formation very similar to that herein produced, the objects being (among others) to facilitate bending of the hooks and to remove the point of upward pressure against a rail base from the extreme edge thereof. Obviously the same result is obtained with the novel form of hooks herein disclosed as regards the point of pressure against the rail base.

It has been stated previously herein that under certain conditions the clip has a tendency to recoil during driving. The same condition manifests itself when the hook 16 is struck down below the rail base for removal of the anchor. Frequently, the clip will fly out of the clamp when released and be lost in a ditch or river or in snow, or may even strike an incautious workman with sufficient violence to cut or bruise. When the hook 19 is formed, as shown in Figures 1 and 2, there results, on the under or outer side of the tail 18, a projection 26 beyond the plane of the tail and a recess or re-entrant angle in which the upper edge of the seat engages. This projection passes over the clamp seat during the earlier stages of driving in the clip and before the tension or straightening of the shank has reached its maximum. When this projection has passed the clamp seat, there is ordinarily no further increase of shank tension from this cause, since the bottom of the projection is normally in a substantially horizontal plane, as will be clearly seen in Figure 1. All further increase in shank tension will be due to travel of the inclined loop tail over the clamp seat up to the moment the hook 16 is forced up into place. If the clip exhibits any tendency to recoil during the final driving, the projection 26 will constitute a stop to check such recoil and to hold the clip against escape from the clamp. The same applies in the operation of removing the anchor. When the hook 16 is knocked down and below the rail base, there is just enough inherent backing out or recoil effect to draw the hook edge under the rail base but ordinarily not enough to overcome the friction of drawing the horizontal portion of the projection 26 over the end of the clamp seat. When the clip is unhooked from the rail, the clamp may be loosened and the complete anchor removed easily and without danger of losing the clip.

As a further feature of improvement, it has been found desirable to trim off the outer corners of the clamp arms, as shown in Figure 1, the former shape being indicated by dotted lines. The trimming starts from a point 23 in the outer edge of each clamp arm, about in line with the lower edge 29 of the rail flange receiving notch 30, and produces an edge 27 lying at an angle of about 45° to the side and top edges of the clamp arms and also produces a corner at 28 which in operative position lies about on a level with the bottom of the rail base. These corners 28, which are lower than corners trimmed off, are the points at which the clamp is struck in driving it on a rail and the results obtained when striking the clamp at these corners are better than when striking at the higher corners which are now eliminated. It has also been found that formerly the existence of the clamp corners constituted what may be described as a mental hazard during driving in the clip and that when the corners are removed the clip may be more readily driven.

In forming the notches 30 of the clamp arms, it is preferred to make the angle between the lower and upper edges 29 and 31, respectively, slightly less than the angle between the upper and lower surfaces of the rail base flange for which the clamp is designed, usually about one degree less. This causes the clamp to bite most tightly on the flange at the open ends of the notches, which condition ensures the greatest degree of ridigity and stability.

It will be noted the upper and lower divergent edges of the notches are out of normal to the edge of the clamp arms and that the outer end of the upper and shorter edge is vertically above a point intermediate the ends of the longer and lower edge, when the clamp is applied to a rail, so the point of maximum grip is intermediate the ends of the longer and lower notch edges.

From all the foregoing, it will be seen that in developing the original conception of a certain form of hook disclosed in a prior application for the purpose of overcoming a serious difficulty, there results, by fortunate coincidence, a series of effluent advantages which may be regarded as of importance almost equal to the perfection initially sought.

It will be noted that when the anchor is applied to a rail, the inclination of the lower clip arm 18 is slightly less than the inclination of the seat 13 and that the arm bears on the seat only at the upper or inner end portion thereof and is elsewhere spaced above the seat. It will also be noted that, owing to the curvature of the upper clip arm 15 which spaces its central portion below the rail base, the clip has two laterally spaced bearing portions engaging the under surface of the rail base, on opposite sides of the clip engagement with the clamp seat and that the clip, when flexed in application, will thrust upwardly against the rail base flanges and is unsupported vertically beneath said bearing engagements with the rail base. Moreover, at a point vertically above the bearing of the clip on the clamp seat, the clip is out of contact with the lower surface of the rail base and thus has a clearly defined three-point support.

Having thus described my invention, what I claim is;—

1. In a rail anchor, a resilient clip member including a substantially straight portion, a hook portion and a reversely curved portion connecting the hook portion and the straight portion whereby the length of the hook portion projecting beyond the face plane of the straight portion is less than the actual length of the hook portion.

2. In a rail anchor, a resilient clip member including a long arm and a short arm connected together side by side, the short arm being turned adjacent its extremity away from the long arm and further turned between the first turn and the extremity and close to the first turn but to a greater extent toward the long arm thereby forming an inwardly turned hook part of the length of which is located between the face and back planes of the arm carrying it whereby the length of hook projecting inwardly of the face plane of the arm is less than the total length of the hook.

3. In a rail anchor, a resilient clip member including a long arm and a short arm connected together side by side, the long arm being turned adjacent its extremity toward the short arm and further turned between the first turn and the extremity and close to the first turn but to a greater extent away from the short arm, thereby forming an outwardly turned hook, part of the length of which is located between the face and back planes of the arm carrying it, whereby the length of hook projecting outwardly of the face plane of the arm is less than the total length of the hook.

4. In a rail anchor, a resilient clip member including a long arm, a short arm inclined thereto and a curved portion connecting the divergent ends of the arms, and portions at the free end of the short arm projecting respectively inwardly and outwardly of the arm.

5. In a rail anchor, a resilient clip member including a long arm, a short arm inclined thereto and a curved portion connecting the divergent ends of the arms, and portions at the free end of the long arm projecting respectively inwardly and outwardly of the arm.

6. In a rail anchor, a resilient clip member including a long arm, a short arm inclined thereto, and a curved portion connecting the divergent ends of the arms, and portions at the free ends of the arms projecting inwardly and outwardly of each arm.

7. In a rail anchor, a resilient clip formed by bending a strip of metal and including a laterally turned hook at one extremity of the strip, the actual length of which hook is in excess of the required effective length, the strip being bent oppositely to the hook at a point close to the root of the hook whereby a part of the length of the hook is located between the face and back planes of the strip, relative to the hook, leaving the length of that portion projecting beyond the face plane of the strip of the required effective length.

8. In a rail anchor, a resilient clip formed by bending a strip of metal and including a laterally turned hook, the length of which projecting beyond the face plane of the strip, relative to the hook, is less than the length of strip which can be held and bent to form the hook, the root portion of the hook being located between the face and back planes of the strip and the strip including a portion adjacent the hook bent outwardly of the back plane of the strip to the opposite side thereof from the hook and reversely bent into alignment with the hook.

9. A rail anchor including a clamp for attachment to one flange of a rail base and formed to present a seat portion beneath such flange inclining toward the opposite flange of the base, and a spring clip comprising a strip of material so bent that passage of the same between the converging surfaces of the flange bottom and the underlying clamp seat to move the leading end of the strip past the edge of the opposite flange will cause upward pressure of said leading end against the flange bottom and partial straightening of the clip, said clip including a hook at its leading end formed by bending the metal of the clip, the length of said hook projecting from the face plane of the adjacent clip portion being only sufficient, when engaged with the flange edge, to securely hold the clip against retreat by reason of its spring action between the converging rail and clamp surfaces, thereby to minimize straightening of the clip, and being less in length than the length of strip which can be held and bent to form the hook, the root portion of the hook being located between the face and back planes of the adjacent strip portion and the strip including a portion close to the root of the hook bent outwardly of the back plane of the strip to the opposite side thereof from the hook and reversely bent into alignment with the hook whereby the necessary length of material is obtained in the hook for bending the same.

10. A rail anchor including a clamp for attachment to one flange of a rail base and adapted to present a seat portion beneath such flange inclining toward the opposite flange of the base, and a spring clip comprising a strip of material formed at one end into a hook and so bent that passage of the same between the converging surfaces of the flange bottom and the underlying clamp seat to move the hooked end into hooking engagement with the edge of the opposite flange will cause flexion of the clip with tendency to retreat by reason of its spring action between the converging rail and clamp surfaces, said clip including a projection therefrom positioned to pass the clamp prior to engagement of the hooked end of the clip with the edge of the base flange and to hold the clip against retreat through the clamp.

11. A rail anchor including a clamp for attachment to one flange of a rail base and adapted to present a seat portion beneath such flange inclining toward the opposite flange of the base, and a spring clip comprising a strip of metal bent to provide long and short arms converging toward their free ends and forming a normally open loop adapted for compression by forcible introduction between the rail base and clamp seat with the long arm engaging the rail adjacent the edges of its flanges and the short arm engaging the clamp seat, said long arm being curved to space the same from the rail base between the points of engagement, a hook on the end of the long arm to engage the flange edge opposite the clamp, and a hook on the end of the short arm to press against the long arm at approximately the point of maximum spacing from the rail base with straightening effect in the long arm, the short arm being bent adjacent its hook away from the long arm to locate a portion of the length of the hook between the face and back planes of the arm for absorption of excess hook length and to obtain a predetermined effective hook length such as will avoid undesirable straightening of the long arm.

12. A rail anchor including a clamp for attachment to one flange of a rail base and adapted to present a seat portion beneath such flange inclining toward the opposite flange of the base, and a spring clip comprising a strip of metal bent to provide long and short arms converging toward their free ends and forming a normally open loop adapted for compression by forcible introduction between the rail base and clamp seat with the long arm engaging the rail adjacent the edges of its flanges and the short arm engaging the clamp seat, said long arm being curved to space the same from the rail base between the points of engagement, a hook on the end of the long arm to engage the flange edge opposite the clamp and a hook on the end of the short arm to press against the long arm at approximately the point of maximum spacing from the rail base with straightening effect in the long arm, the short arm being bent adjacent its hook away from the long arm to form a projection outward of the back plane of the short arm positioned to pass the clamp prior to hooking engagement of the flange edge by the hook of the long arm, said projection forming a stop serving to hold the clip against retreat through the clamp due to expansive action of the compressed loop.

13. A rail anchor including a clamp for attachment to one flange of a rail base and adapted to present a seat portion beneath such flange inclining toward the opposite flange of the base, and a spring clip comprising a strip of metal bent to provide long and short arms converging toward their free ends and forming a normally open loop adapted for compression by forcible introduction between the rail base and clamp seat with the long arm engaging the rail adjacent the edges of its flanges and the short arm engaging the clamp seat, said long arm being curved to space the same from the rail base between the points of engagement, a hook on the end of the long arm to engage the flange edge opposite the clamp and a hook on the end of the short arm to press against the long arm at approximately the point of maximum spacing from the rail base with straightening effect in the long arm, the short arm being bent adjacent its hook away from the long arm to locate a portion of the length of the hook between the face and back planes of the arm for absorption of excess hook length and to obtain a predetermined effective hook length such as will avoid undesirable straightening of the long arm and to form a projection outward of the back plane of the short arm positioned to pass the clamp prior to hooking engagement of the flange edge by the hook of the long arm, said projection forming a stop serving to hold the clip against retreat through the clamp due to expansive action of the compressed loop.

14. In a rail anchor, a resilient clip member comprising a strip of material bent at one end to form a hook and bent intermediate its ends to form a loop and bent into a hook at the second end, the length of said last mentioned hook being in excess of a predetermined maximum, said strip of metal being further bent adjacent the last mentioned hook and in the opposite direction to the bend of the hook, the amount of last mentioned bend being sufficient to set the hook back a distance equal to any excessive length whereby the projection of the hook beyond the strip is not more than the said maximum.

15. In a rail anchor, a resilient clip member comprising a strip of material bent at one end to form a hook and bent at a point materially spaced from the hook and in the opposite direction to said hook to form a loop and two arms, and bent at the remaining end to form on the second arm a hook projecting toward the first arm between the first hook and the loop bend, the length of said second hook being in excess of a predetermined maximum, said strip being bent in the second arm adjacent the second hook and away from the first arm an amount sufficient to set the hook back a distance equal to any excessive length thereof, whereby the projection of the hook beyond the second arm is not more than said maximum.

16. In a rail anchor, a resilient clip member comprising a strip of material bent at one end to form a hook and bent at a material distance from the hook and in the same direction to form a loop and two arms, the second arm extending across the end of the hook, and further bent at the end of the second arm and oppositely to the loop bend to form a second hook, the length of said second hook being in excess of a predetermined maximum, the second arm being bent adjacent the second hook and in the opposite direction an amount sufficient to set the hook back a distance equal to any excessive length thereof whereby the projection of the hook beyond the second arm is not more than the said maximum.

17. In a rail anchor, a resilient clip member comprising a strip of material bent intermediate its ends to form a pair of arms lying side by side and also bent at its extremities to form hooks, the actual lengths of which are in excess of predetermined maximum, the arms being bent adjacent the hooks but in the opposite direction to the respective hooks an amount sufficient to set the hooks back each through a distance equal to the excess length thereof, whereby the projection of each hook beyond the arm carrying it is not more than the said maximum.

18. In a rail anchor, a clamp comprising a member notched in one edge to embrace one flange of a rail base and to be positioned at an incline, the member having its edge opposite the notch formed to provide a corner approximately in line with that edge of the notch designed for engagement with the bottom of the rail base, which corner is adapted to project farther laterally from a rail to which the clamp is attached than any other part of the clamp, and a clip member adapted to co-operate with the clamp and a rail to hold the clamp to the rail.

19. In a rail anchor, a clip member having one end bent laterally to form a hook, the clip member adjacent the hooked end being reversely bent so that the effective length of the hook is less than its actual length.

20. In a rail anchor, a clip member including a hooked end projecting at one side of the clip, the clip adjacent the hook being bent back in the direction opposite to that in which the hooked end projects, whereby the effective length of the hook is decreased.

21. In a rail anchor a clip member including a substantially straight portion to engage a rail base, having one end bent laterally to form a hook to engage the rail base edge, the clip member adjacent the hooked end being bent away from the rail base so that the effective rail-engaging portion of the hook is less than its actual length.

22. In a rail anchor, a clamp member formed from a rectangular metal plate notched at one edge to embrace one rail base flange and so that the plate will incline inwardly beneath the rail base, the upper outer corner of the plate being removed whereby the remaining portion of the plate which projects farthest laterally from the rail is substantially in line with the bottom of the rail base.

23. In a rail anchor, a clamp member formed from a rectangular metal plate bent into a U-shape, with the two legs of the bent plate notched at an angle to engage one flange of a rail with the looped portion of the plate projecting beneath the rail base, the upper outer corners of the legs being removed whereby the portions of the plate which project farthest laterally from the rail are substantially in the plane of the bottom of the rail base.

24. In a rail anchor, a clamp member for attachment to one edge of a rail base, a resilient clip member to be compressed at one end between said clamp member and the base of a rail carrying the clamp member, said clip member being adapted at its other end to engage the edge of a rail base opposite the clamp member, and a projecting portion on one of said members to engage the other member and hold the two against separation due to recoil of the clip member during application to a rail.

25. In a rail anchor, a clamp member for attachment to one edge of a rail base and presenting a clip engaging surface beneath a rail base, a resilient clip member hooked at one end to engage that edge of a rail base opposite the clamp member and including a resilient looped portion presenting a clamp engaging surface, the said loop being designed to be compressed between the rail base and clamp with retroactive effect to hold its hooked end against the edge of the rail base, and a projection from one of said mutually engaging member surfaces engageable with the other member to hold the members against separation due to the retroactive or recoil effect of the loop when the clip is out of hooking engagement with a rail base.

26. In a rail anchor, a clamp member to engage one edge of a rail base and including a clip seat to be disposed beneath the rail, a clip member hooked at one end to engage that edge of a rail base opposite the clamp member and including a resilient loop to rest upon the seat portion of the clamp member and to be compressed between said seat and a rail base, said clamp seat and clip loop presenting shoulders for mutual engagement to check recoil movement of the clip due to expansive action of its loop.

27. In a rail anchor, a clamp comprising a member notched in one edge to embrace one flange of a rail base, both edges of said notch being out of normal to the edge of the member whereby the outer end of one of said notch edges lies opposite a point intermediate the ends of the other edge, the angle between the edges of the notch being slightly less than the angle between the upper and lower surfaces of the rail base flange for which the clamp is adapted.

28. In a rail anchor, a clamp comprising a member notched in one edge to embrace one flange of a rail base, the edges of said notches being of different lengths whereby the outer end of the shorter edge lies opposite a point intermediate the ends of the other edge, the angle between the edges of the notch being slightly less than the angle between the upper and lower surfaces of the rail base flange for which the clamp is adapted.

29. In a rail anchor, a clamp comprising a member notched in one edge to embrace one flange of a rail base, the angle between the edges of the notch being less than the angle between the upper and lower surfaces of the rail base flange for which the clamp is adapted, whereby the clamp will grip the rail base flange most tightly at the open end of the notch, the edges of said notch being of unequal length whereby the point of greatest pressure of the short edge on the rail base is opposite a point intermediate the ends of the longitudinal edge and tends to hold the entire length of the long edge firmly against the rail base flange.

30. A rail anchor comprising a rail gripping member and a separately formed retaining member; said gripping member including jaws adapted to engage one flange of a rail base and a seat portion adapted to be supported below the rail base; said retaining member including a portion overlying said seat and resting upon said seat at the end thereof nearest the other rail base flange and spaced above the intermediate portion and opposite end portion of said seat, said retaining member further including a portion extending transversely beneath the rail and terminating in a hook adapted to engage the edge of the other rail base flange.

31. A rail anchor comprising a rail gripping member and a separately formed retaining member; said gripping member including jaws adapted to engage one flange of a rail base and a seat portion adapted to be supported beneath the rail base at an inclination upward toward the other flange of said rail base; said retaining member including a portion overlying said seat and resting upon the upper end portion of said seat and elsewhere spaced above the seat, said retaining member further including a portion extending transversely beneath the rail and terminating in a hook adapted to engage the edge of the other rail base flange.

32. A rail anchor comprising a rail gripping member and a separately formed retaining member; said gripping member including jaws adapted to engage one flange of a rail base and a seat portion adapted to be supported beneath the rail base at an inclination upward toward the other flange of said rail base; said retaining member including a resilient loop portion overlying the seat and a portion extending from the loop portion transversely beneath the rail base and terminating in a hook adapted to engage the edge of the other rail base flange, said loop portion having a lower surface disposed at an inclination slightly less than the inclination of the seat and engaging the upper end portion of the seat and elsewhere spaced above the seat.

33. A rail anchor comprising a rail gripping member and a separately formed retaining member; said gripping member including jaws adapted to engage one flange of a rail base and a seat portion adapted to be supported beneath the rail base at an inclination upward toward the other flange of said rail base; said retaining member being formed of a bar of metal bent at one end to form a hook adapted to engage the edge of the other rail base flange and bent intermediate its ends to form on one side of the bend a long arm carrying said hook, and on the other side of the bend a short arm inclining toward an intermediate point of the long arm, said arms and the bend defining a loop; the said retaining member being, when assembled with the gripping member on a rail, arranged with the loop thereof overlying the gripping member seat and one of said arms inclining similarly to the seat but at lesser inclination than the seat and resting upon the upper end portion of the seat and elsewhere spaced above the seat.

34. A rail anchor comprising a rail gripping member and a separately formed retaining member; said gripping member including jaws adapted to engage one flange of a rail base and a seat portion adapted to be supported beneath the rail base at an inclination upward toward the other flange of said rail base; said retaining member being formed of a bar of metal bent at one end to form a hook adapted to engage the edge of the other rail base flange and bent intermediate its ends to form on one side of the bend a long arm carrying said hook, and on the other side of the bend a short arm inclining toward an intermediate point of the long arm, said arms and the bend defining a loop; the said retaining member, when assembled with the gripping member on a rail, being arranged with the loop thereof overlying the gripping member seat and the short arm inclining similarly to the seat but at lesser inclination than the seat and resting upon the upper portion of the seat and elsewhere spaced above the seat.

35. A rail anchor comprising a rail gripping member and a separately formed retaining member; said gripping member including jaws adapted to engage one flange of a rail base and a seat portion adapted to be supported beneath the rail base, said retaining member resting, when assembled with the gripping member on a rail, only intermediate its ends on said seat and at its ends engaging the rail base flanges respectively.

36. A rail anchor comprising a rail gripping member and a separately formed retaining member; said gripping member including jaws adapted to engage one flange of a rail base and a seat portion adapted to be supported beneath the rail base, said retaining member resting, when assembled with the gripping member on a rail, only intermediate its ends on said seat and thrusting upwardly at its ends against the lower surfaces of the rail base flanges respectively.

37. A rail anchor comprising a rail gripping member and a separately formed retaining member; said gripping member including jaws adapted to engage one flange of a rail base and a connecting web presenting a seat portion adapted to be supported beneath the rail base intermediate the edges thereof; said retaining member being adapted to engage with the rail base flanges at locations spaced laterally on each side of said seat portion and having a lower surface portion resting upon said seat portion and inclined relatively to the lower surface of the rail during application to a rail and adapted upon movement of the retaining member transversely of the rail to thrust the retaining member upwardly against the rail base flanges.

38. A rail anchor comprising a rail gripping member and a separately formed retaining member; said gripping member including jaws adapted to engage one flange of a rail base and a seat portion adapted to be supported beneath the rail base intermediate the edges thereof; said retaining member including an intermediate portion resting upon the seat and spaced below the rail base and end portions bearing against the rail base on opposite sides of the intermediate portion, said end portions being unsupported beneath their points of engagement with the rail base.

39. A rail anchor comprising a rail gripping member and a separately formed retaining member; said gripping member including jaws adapted to engage one flange of a rail base and a seat portion adapted to be supported beneath the rail base intermediate the edges thereof; said retaining member including a hook at one end to engage the edge of the other rail base flange and a loop at the opposite end presenting an inclined lower surface resting upon said seat and an upper surface bearing against the bottom of that rail base flange engaged by the gripping member at a point horizontally nearer the rail base edge than the engagement with the seat.

40. A rail anchor comprising a rail gripping member and a separately formed retaining member; said gripping member including jaws adapted to engage one flange of a rail base and a seat portion adapted to be supported below the rail base, said seat portion projecting upwardly at its inner end; said retaining member including at one end a hook adapted to engage the edge of the other rail base flange and at the other end a loop adapted to be compressed between said seat and the rail base, said loop being formed in its lower surface with a recess for the reception of the upwardly projecting end of the seat.

FRANCIS W. COOPER.